US011244041B2

(12) United States Patent
Orozco Cervantes et al.

(10) Patent No.: US 11,244,041 B2
(45) Date of Patent: Feb. 8, 2022

(54) DYNAMIC PASSWORD GENERATION USING MORPHOLOGICAL GROUPS

(71) Applicant: International Business Machines Corporation, Armonk, NY (US)

(72) Inventors: Humberto Orozco Cervantes, Tonalá (MX); Carolina Garcia Delgado, Zapopan (MX); Paul Llamas Virgen, Zapopan (MX); Vladimir Garcia Saavedra, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/809,615

(22) Filed: Mar. 5, 2020

(65) Prior Publication Data

US 2021/0279324 A1    Sep. 9, 2021

(51) Int. Cl.
*H04L 9/08* (2006.01)
*H04L 9/32* (2006.01)
*G06F 21/46* (2013.01)

(52) U.S. Cl.
CPC ............ *G06F 21/46* (2013.01); *H04L 9/0863* (2013.01)

(58) Field of Classification Search
CPC ................................ G06F 21/46; H04L 9/0863
See application file for complete search history.

(56) References Cited

U.S. PATENT DOCUMENTS

| 5,128,672 | A  | 7/1992  | Kaehler          |
|-----------|----|---------|------------------|
| 5,802,176 | A  | 9/1998  | Audebert         |
| 5,867,386 | A  | 2/1999  | Hoffberg et al.  |
| 5,920,303 | A  | 7/1999  | Baker et al.     |
| 7,065,786 | B2 | 6/2006  | Taguchi          |
| 7,093,282 | B2 | 8/2006  | Hillhouse        |
| 7,912,697 | B2 | 3/2011  | Tomishige et al. |
| 8,286,000 | B2 | 10/2012 | Vedula et al.    |
| 8,494,959 | B2 | 7/2013  | Hathaway et al.  |
| 8,812,972 | B2 | 8/2014  | Bangalore        |
| 10,229,399 | B2 | 3/2019 | Urban            |
| 2007/0186115 | A1 | 8/2007 | Gao et al.      |
| 2009/0150971 | A1* | 6/2009 | Vedula .................. H04L 9/0891 726/1 |
| 2009/0165102 | A1* | 6/2009 | Zagni ...................... G06F 21/33 726/6 |

(Continued)

FOREIGN PATENT DOCUMENTS

CN        1142653 C       3/2004
CN      101252435 B       6/2010

(Continued)

*Primary Examiner* — Vu V Tran
(74) *Attorney, Agent, or Firm* — Timothy J. Singleton (57) ABSTRACT

A method, system, and computer program product for dynamic password generation and authentication based on morphological groupings is provided. The method receives a set of morphological groups defining a plurality of character maps. The method receives selection of a subset of morphological groups by a user from the set of morphological groups. A set of characters input from the user are identified, with the set of characters forming a user selected password. The method generates a morphological password using the set of characters and the subset of morphological groups selected by the user. The method stores the morphological password in a password repository.

17 Claims, 6 Drawing Sheets

(56) References Cited

U.S. PATENT DOCUMENTS

| | | | |
|---|---|---|---|
| 2015/0012873 A1 | 1/2015 | Bi et al. | |
| 2019/0034614 A1* | 1/2019 | Liu | H04L 29/06 |
| 2021/0218731 A1* | 7/2021 | Ma | H04L 63/20 |
| 2021/0240815 A1* | 8/2021 | Tsou | G06F 21/46 |

FOREIGN PATENT DOCUMENTS

| | | |
|---|---|---|
| CN | 102063196 A | 5/2011 |
| CN | 202004967 U | 10/2011 |
| CN | 102750009 A | 10/2012 |
| CN | 102857615 A | 1/2013 |
| CN | 104394002 A | 3/2015 |
| CN | 205680209 U | 11/2016 |
| CN | 103516525 B | 1/2017 |
| CN | 107977569 A | 5/2018 |
| EP | 2154625 A3 | 4/2010 |
| WO | 2013117019 A1 | 8/2013 |
| WO | 2017132708 A1 | 8/2017 |

* cited by examiner

DYNAMIC PASSWORD GENERATION USING MORPHOLOGICAL GROUPS

BACKGROUND

Digital connectivity is steadily increasing. Various types of devices and resources are now available for connection and interaction across communications networks. Devices as well as virtual processes are now often connected to the internet for ease of access, data collection, and data sharing. With increasing connectivity and availability of resources and devices comes an increased risk of cybersecurity threats for these devices, virtual processes, and data associated therewith.

Devices and services accessed through communications networks are often accessed using access controls such as user authentication. User authentication methods, such as usernames and passwords, may be used to authenticate a user to access a device or service. Passwords and usernames may provide variable security based on a complexity of such credentials. Often users create passwords that lack suitable complexity and are quickly guessed or cracked. Some systems employ password rules, often relating to password length and special characters, to encourage password complexity. Such password rules often fail to enforce suitable password complexity due to users recycling, reusing, or including obvious variations of passwords.

SUMMARY

According to an embodiment described herein, a computer-implemented method for dynamic password generation and authentication based on morphological groups is provided. The method receives a set of morphological groups defining a plurality of character maps. The method receives selection of a subset of morphological groups by a user from the set of morphological groups. A set of characters input from the user are identified, with the set of characters forming a user selected password. The method generates a morphological password using the set of characters and the subset of morphological groups selected by the user. The method stores the morphological password in a password repository.

According to an embodiment described herein, a system for dynamic password generation and authentication based on morphological groups is provided. The system includes one or more processors and a computer-readable storage medium, coupled to the one or more processors, storing program instructions that, when executed by the one or more processors, cause the one or more processors to perform operations. The operations receive a set of morphological groupings defining a plurality of character maps. The operations receive selection of a subset of morphological groups by a user from the set of morphological groups. A set of characters input from the user are identified by the operations, with the set of characters forming a user selected password. The operations generate a morphological password using the set of characters and the subset of morphological groups selected by the user. The operations store the morphological password in a password repository.

According to an embodiment described herein a computer program product for dynamic password generation and authentication based on morphological groupings is provided. The computer program product includes a computer readable storage medium having program instructions embodied therewith, the program instructions being executable by one or more processors to cause the one or more processors to receive a set of morphological groups defining a plurality of character maps. The computer program product receives selection of a subset of morphological groups by a user from the set of morphological groups. A set of characters input from the user are identified, with the set of characters forming a user selected password. The computer program product generates a morphological password using the set of characters and the subset of morphological groups selected by the user. The computer program product stores the morphological password in a password repository.

DETAILED DESCRIPTION

The present disclosure relates generally to methods for password generation and authentication. More particularly, but not exclusively, embodiments of the present disclosure relate to a computer-implemented method for generating complex, dynamic passwords based on morphological groups. The present disclosure relates further to a related system for password generation and authentication, and a computer program product for operating such a system.

Devices and services accessible by communications networks often employ access or authentication controls. Such access controls may be employed due to the collection and sharing of data done by these physical devices and virtual processes. In matters of user authentication of physical devices, passwords and usernames often provide relatively weak access controls. The efficacy of passwords and usernames may be weakened by users accidentally or intentionally using weak passwords, repeated passwords, personal information, easily derived or discovered words and phrases, combinations thereof, and other ill-suited information. Similarly, users may accidentally or intentionally circumvent password rules intended to increase a complexity of a user-generated password. For example, users may employ simple iterative changes to passwords (e.g., changing "password1" to "password2") when forced to refresh a password credential. Such password weakness may result in easier improper access to devices and information systems containing or generating sensitive data.

Authentication systems have generally responded with additional password rules to further enforce password complexity. For example, some systems employ long passwords (e.g., a character length rule), special characters, upper case, lower case, combinations thereof, and other similar rules. Some systems use increasingly long definitions of characters and combinations in rules in effort to preclude some types of cybersecurity threats. Some authentication systems have adopted two-factor authentication as an added layer of security. These systems may use specified and authorized devices associated with a user to log into applications, services, and networked devices by prompting entry of a one-time use code transmitted to the device in response to an authorization or log in attempt.

However, systems and methods capable of generating more dynamic and complex authentication methods are needed. Further, systems and methods capable of generating more dynamic, complex, and secure passwords are needed. Some embodiments of the present disclosure describe systems, methods, and computer program products capable of generating dynamic and using authentication credentials for users. Example authentication credentials include complex passwords dynamically generated for users based on user input and morphological groups. These embodiments enable generation of authentication credentials based on a morphological keyboard and a defined group of characters. In some embodiments, grouping characters enables generation and use of authentication credentials dynamically. Such dynamic generation and use of authentication credentials may increase the complexity of authentication credentials and increase difficulty in breaching, exposing, or otherwise compromising those authentication credentials. In some embodiments, the present disclosure enables systems and devices to dynamically change a morphological group to dynamically change a password. Changes of the password, based on a dynamic change to a morphological group, may be based on rules and group definitions which enable the present disclosure to maintain a single password and authenticate subsequent login attempts with that password using different morphological groups. Embodiments of the present disclosure lower risks associated with cybersecurity threats such as social engineering, brute force attacks, phishing, SQL injections, Cross Site Scripting, and others. Embodiments of the present disclosure enable secure password generation and dynamic password entry and authentication using mutable morphological group definitions.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
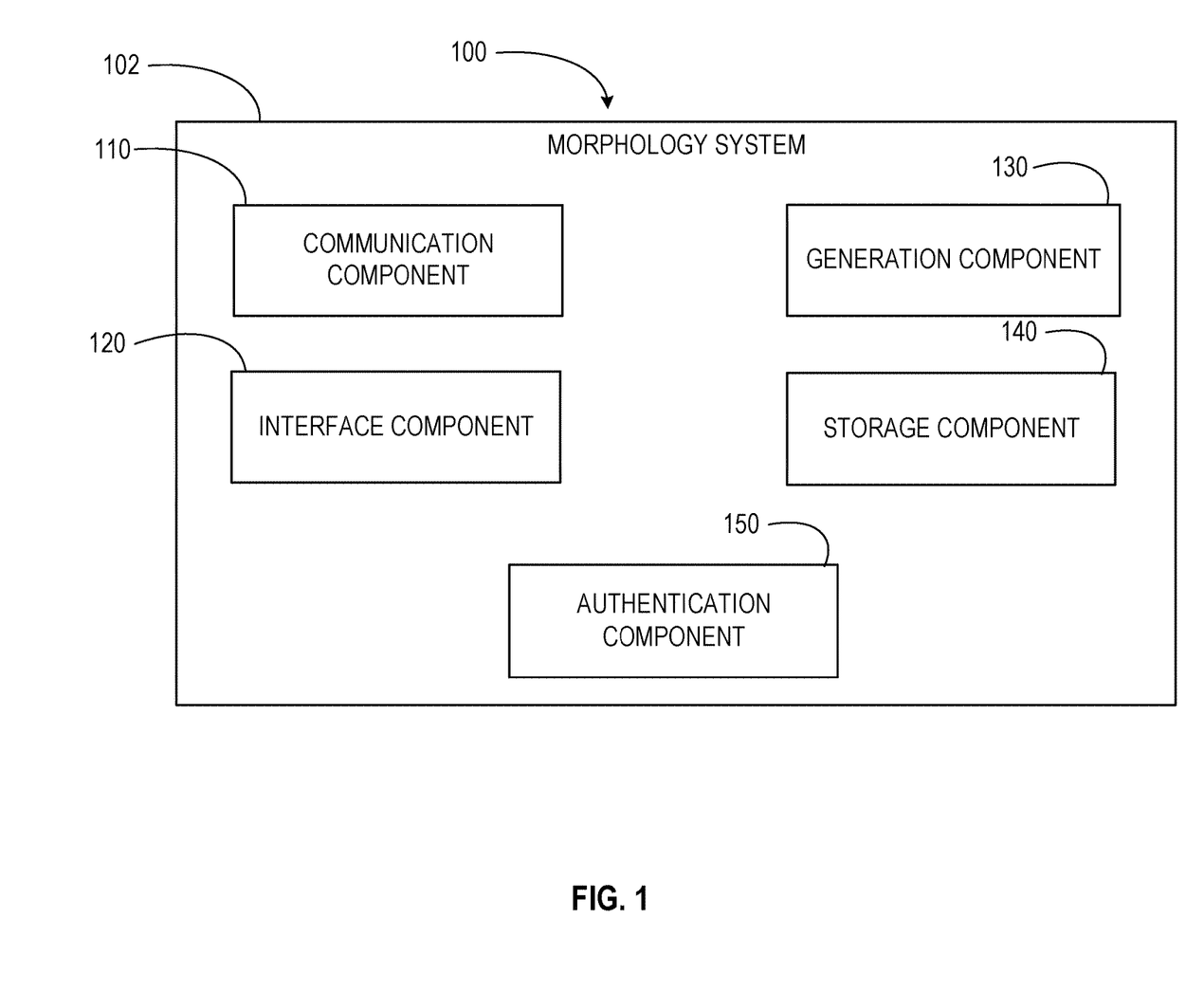
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a morphology system 102. The morphology system 102 may comprise a communication component 110, an interface component 120, a generation component 130, a storage component 140, and an authentication component 150. The communication component 110 receives and accesses information transmitted to the morphology system 102 including sets of morphological groups and definitions or rules associated therewith. The interface component 120 generates user interface screens and elements and receives input from a user of the morphology system 102. The generation component 130 dynamically generates authentication credentials (e.g., passwords) based on user input and morphological groups. The storage component 140 stores and encrypts authentication credentials generated by the generation component 130. The authentication component 150 authenticates users based on the authentication credentials generated by the generation component 130 and subsequent authentication credentials generated using morphological groups. Although described with distinct components, it should be understood that, in at least some embodiments, components may be combined or divided, or additional components may be added, without departing from the scope of the present disclosure.

Figure 2:
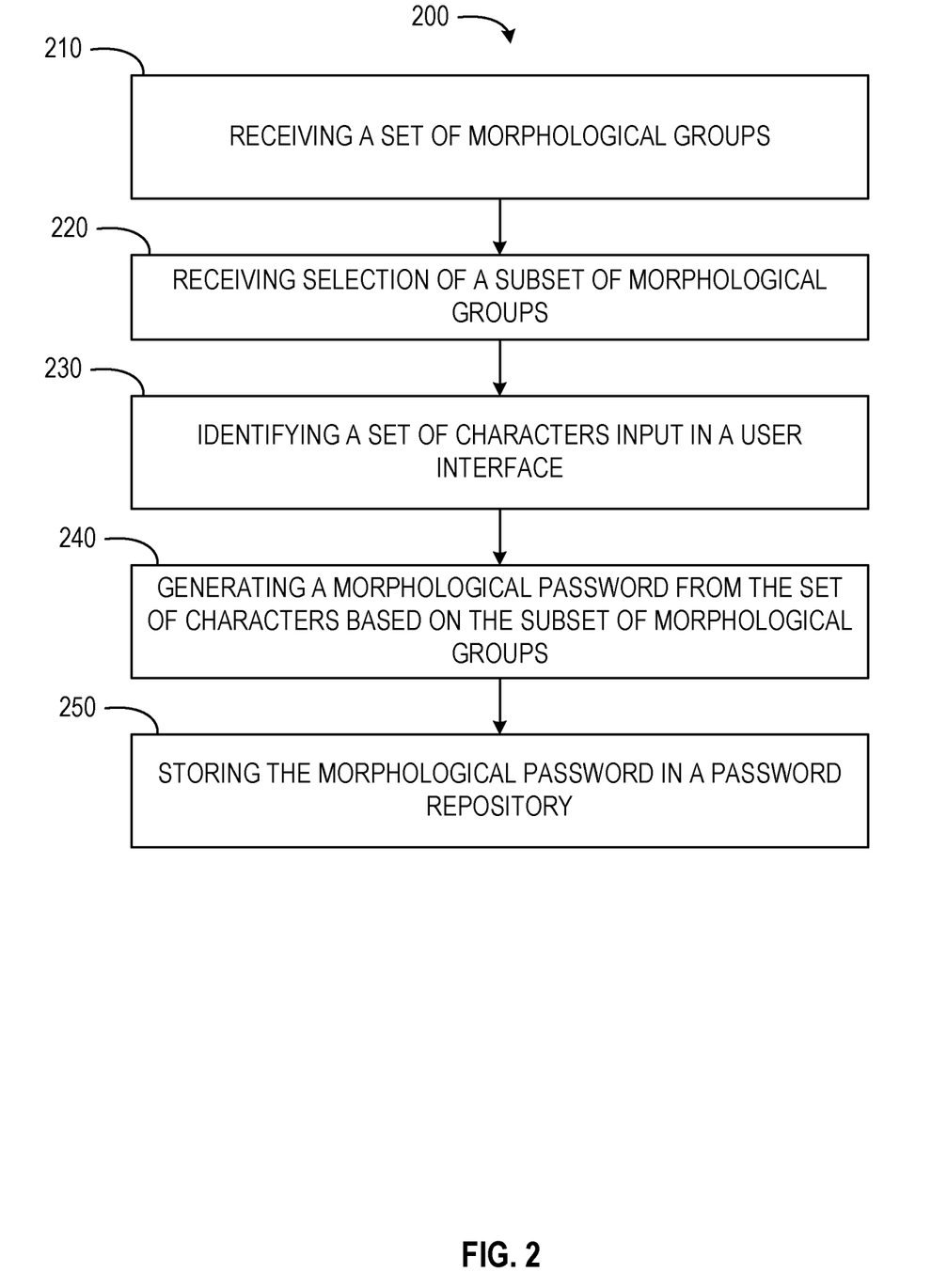
FIG. 2 depicts a flow diagram of a computer-implemented method for dynamic password generation based on morphological groupings, according to at least one embodiment.

Referring now to FIG. 2, a flow diagram of a computer-implemented method 200 is shown. The computer-implemented method 200 is a method for dynamic password generation based on morphological groupings. In some embodiments, the computer-implemented method 200 may be performed by one or more components of the computing environment 100, as described in more detail below.

At operation 210, the communication component 110 receives a set of morphological groups. The set of morphological groups define a plurality of character maps. In some embodiments, each morphological group of the set of morphological groups include groups of characters for generation and use of authentication credentials (e.g., passwords) based on morphological mechanisms. In some embodiments, each morphological group of the set of morphological groups includes a character map or set of rules. The character map or set of rules may be used to map, convert, or otherwise change characters, in a string received from a user, to generate a morphological password. In some instances, the character maps of each morphological group are mutually exclusive, precluding a first character from being mapped to a same second character in more than one morphological group.

The set of morphological groups and the character maps of the morphological groups may be default, specially configured (e.g., configured by a user), dynamically configured (e.g., configured by the morphology system 102), combinations thereof, or generated in any suitable manner. In some embodiments, once used to generate a morphological password for a user, the set of morphological groups may be locked or otherwise established for the morphological password and the user. In such instances, once the morphological password is set for change, the user initiates a password change, or other factors or circumstances initiate a password change, the morphological groups may be regenerated or reconfigured to form new morphological groups. Further, once established, the morphological groups may be used to authenticate a password generated using any one or more of the morphological groups.

As referenced above, each morphological group may include a character map, a set of rules, or a set of characters associated with the specified morphological group. For example, a first morphological group may be a grouping of lowercase characters with a curve. A second morphological group may be a grouping of lowercase characters without a curve. Similarly, morphological groups may be formed from characters including capital letters with a curve, capital letters without a curve, numbers with a curve, numbers without a curve, special characters with a curve, special characters without a curve, and other similarity-based or rule-based groupings of characters.

At operation 220, the interface component 120 receives selection of a subset of morphological groups. Selection of the subset of morphological groups may be performed by a user within a user interface presented by the interface component 120. The subset of morphological groups is selected from the set of morphological groups received in operation 210. For example, each morphological group in the subset of morphological groups may be a morphological group selected from the set of morphological groups. In some embodiments, the subset of morphological groups is a first subset of morphological groups for generating a morphological password.

For example, the user may be presented with user interface elements for five morphological groups within a user interface presented by the interface component 120. The user may select a first user interface element for a first morphological group and a second user interface element for a second morphological group. The first morphological group and the second morphological group may comprise the subset of morphological groups selected by the user in operation 220. The set of morphological groups (e.g., the five morphological groups) may be retained by the morphology system 102.

At operation 230, the interface component 120 identifies a set of characters input within a user interface. The set of characters may be input from a user interacting with the user interface. In some embodiments, the set of characters form a user selected password. The set of characters may be selected by the user without prompting. The set of characters may also be selected by the user according to one or more rules or suggestions. Rules or suggestions provided to the user may represent password rules or characteristics generated by the morphology system 102 to strengthen passwords generated by a user. In some embodiments, the set of characters may represent a new password. The set of characters may also represent a preexisting password to be converted to add additional security or complexity to an existing set of login credentials.

At operation 240, the generation component 130 generates a morphological password. The morphological password is generated using the set of characters and the subset of morphological groups selected by the user. In some embodiments, the morphological password is generated in response to receiving the subset of morphological groups and identifying the set of characters. In the example described above in operation 220, the generation component 130 generates the morphological password using the first morphological group and the second morphological group as the subset of morphological groups selected by the user.

In some embodiments, the generation component 130 generates the morphological password by converting at least a portion of the set of characters based on the subset of morphological groups selected in operation 220. The morphology of one or more of the subset of morphological groups may be applied to one or more of the characters from the set of characters to convert the set of characters. In converting the set of characters, or a suitable number of characters from the set of characters, the generation component 130 generates the morphological password.

For example, the user may select a first morphological group and a second morphological group. The first morphological group may be defined by lowercase letters with curves and the second morphological group may be defined by lowercase letters without curves. The set of characters entered by the user may include the letters "Hola." The generation component 130 may generate the morphological password, using the first morphological group, as "Hqgj." The generation component 130 may generate the morphological password, using the second morphological group, as "Hwil." In some embodiments, where two morphological groups are selected, the generation component 130 may generate the morphological password, using the first and second morphological groups, as a set of passwords including "wi1235," "wil," "235," "w35," "2i5," or other suitable morphological passwords. The length of the morphological password may be based on rules associated with one or more of the morphological groups. In some instances, the user is presented a set of morphological passwords for selection of a desired morphological password. In some instances, the morphology system 102 selects a morphological password from the set of generated morphological passwords based on password rules, complexity, or any other suitable selection criteria. By way of further example, the user may be tasked to remember the password "Hola" and, based on dynamic group definitions of morphological groups, may authenticate a login using morphological groups and entering passwords such as h0la, Hoi4, h014, or hG14.

In some instances, the morphological password is a first morphological password to be associated with a user. The first morphological password may be used to authenticate the user. The first morphological password may be used to authenticate the user by comparing the first morphological password to a second morphological password, input and generated at a later time or subsequent session.

In generating the morphological password in some embodiments, the generation component 130 determines an ambiguity or an ambiguous character of the set of characters. The ambiguity or ambiguous character is based on the character and a transformation or conversion to be performed on that character based on a specified morphological group of the subset of morphological groups. For example, the ambiguity may occur when a character is difficult (e.g., exceeds a difficulty threshold or similarity threshold) to identify morphologically by the type of group or groups within the subset of morphological groups when the password is to be used. In such instances, the generation component 130 accesses one or more ambiguity rules associated with one or more morphological groups of the set of morphological groups or the subset of morphological groups. The generation component 130 then generates or configures the morphological password according to the one or more ambiguity rules, the one or more characters, and the subset of morphological groups. For example, the generation component 130 may determine that a specified character is an ambiguous character in light of a morphological group and the one or more ambiguity rules. The generation component 130, based on the one or more ambiguity rules, may skip or exclude the specified character from conversion, apply a different morphological group for conversion, or any other suitable action.

By way of further example, where the generation component 130 determines a character is ambiguous based on the character and the morphological group, the generation component 130 may access an ambiguity rule instructing the generation component 130 to skip the character. In some instances, a morphological character, to which a specified character is to be converted according to the morphological group, may be determined to be ambiguous. The generation component 130 may access an ambiguity rule instructing the generation component 130 to revert the morphological character back to the specified character entered by the user or use an alternate morphological character according to the morphological group selected by the user or another morphological group.

In some embodiments, when ambiguity or an ambiguous character is identified, the generation component 130 resolves the ambiguity in favor of additional password complexity. In such instances, a set of possible actions or ambiguity rules may be presented to the generation component 130. The generation component 130 may determine an action or set of actions which resolves the ambiguity while achieving a maximum complexity, theoretically maximum complexity, or a threshold password complexity. The generation component 130 may then resolve the ambiguity (e.g., omitting the character, skipping conversion of the character, etc.) in a manner that increases or maintains a suitable level of password complexity. In some instances, where the generation component 130 independently resolves the ambiguity, the generation component 130 cooperates with the interface component 120 to generate a notification for the user. The notification may indicate one or more of the ambiguity, the action taken to solve the ambiguity, and any change to the password or set of characters, for subsequent entry by the user when using the morphological password, performed by the generation component 130.

In some embodiments, when ambiguity or an ambiguous character is identified, the generation component 130 cooperates with the interface component 120 to present a modified user interface to a user. The modified user interface may prompt the user to correct, address, or otherwise resolve the ambiguity. For example, the user interface may prompt the user to select a different character or select a different morphological group to resolve the identified ambiguity or ambiguous character.

In some embodiments, once the morphological password has been generated, the generation component 130 and the interface component 120 cooperate to transmit or otherwise present the morphological password to the user. The morphological password may be transmitted via email, SMS message, or other suitable manner. In some instances, the morphological password is transmitted to the user in an encrypted form. In some embodiments, once the morphological password has been generated, password definitions and morphological groups may be encrypted together or separately.

At operation 250, the storage component 140 stores the morphological password in a password repository. The password repository may be a storage device or storage medium located within or in communication with the morphological system 102. The password repository may reside on a portion of a storage device or medium along with other data. The storage device or storage medium on which the password repository resides may be remote from a computing device accessed or used by the user to select the subset of morphological groups and enter the set of characters. In some embodiments, the storage component 140 stores the morphological password using one or more storage operations.

The storage component 140 may prepare the morphological password for storage, prior to storing the morphological password. In some instances, the storage component 140 encrypts the morphological password to generate an encrypted morphological password. In embodiments where the storage component 140 encrypts the morphological password, the storage component 140 stores the encrypted morphological password within the password repository. The morphological password may be encrypted individually or stored on and encrypted along with other morphological passwords. The morphological password may be encrypted using any suitable encryption function, algorithm, or process.

Figure 3:
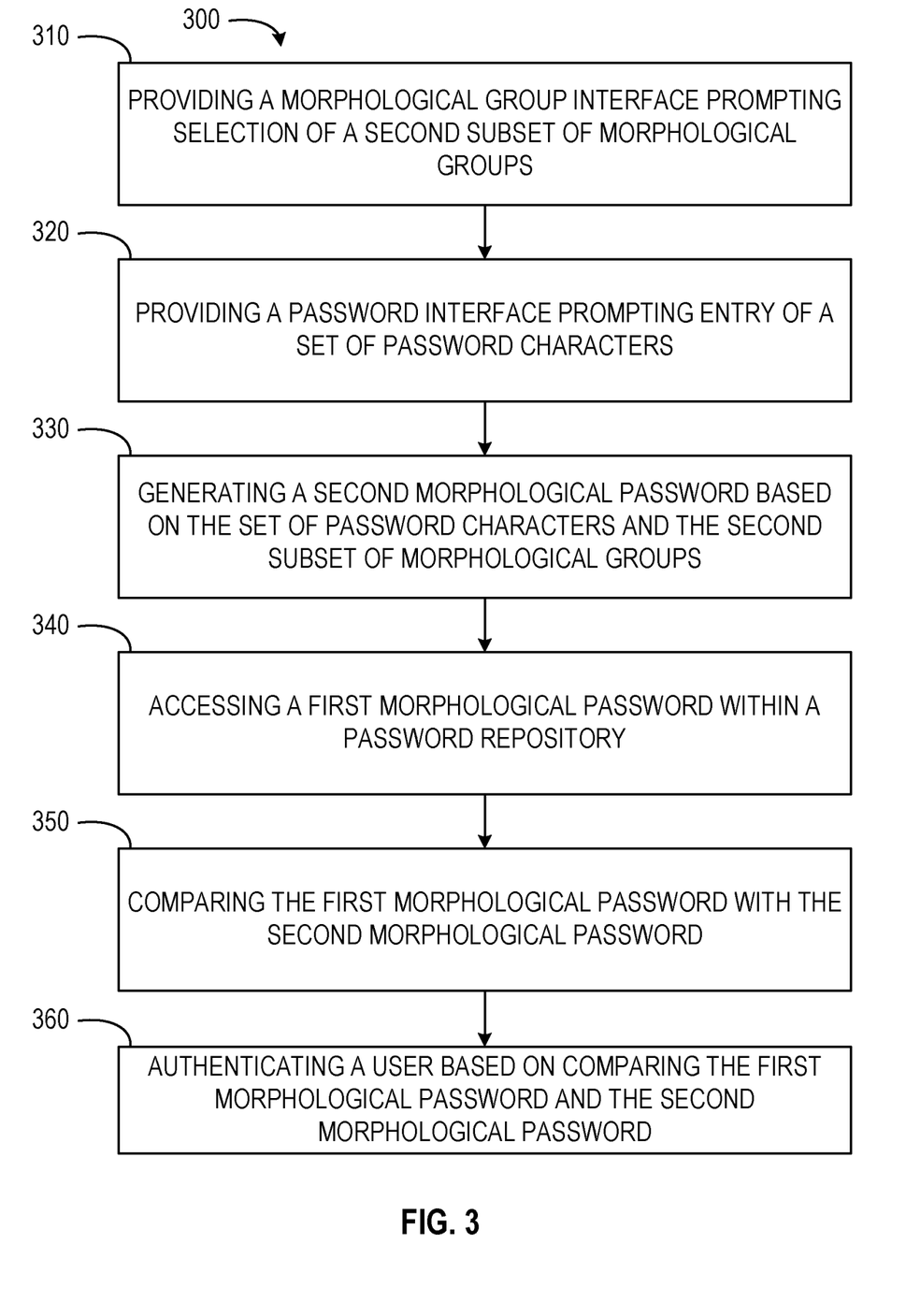
FIG. 3 depicts a flow diagram of a computer-implemented method for dynamic password generation and authentication based on morphological groupings, according to at least one embodiment.

FIG. 3 shows a flow diagram of an embodiment of a computer-implemented method 300 for dynamic password generation and authentication based on morphological groupings. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the interface component 120 provides a morphological group interface. The morphological group interface may be provided in response to receiving a user authentication request, as in operation 220. The morphological group interface prompts selection of a subset of morphological groups. Where an initial subset or first subset of morphological groups have been selected in generation of a morphological password, the morphological group interface may prompt selection of a second subset of morphological groups for authentication of a user.

In some embodiments, morphological groups selected from the set of morphological groups for the first subset of morphological groups, in operation 220, match the morphological groups selected from the set of morphological groups for the second subset of morphological groups, in operation 310. In some instances, morphological groups selected from the set of morphological groups for the first subset of morphological groups, in operation 220, differ from the morphological groups selected from the set of morphological groups for the second subset of morphological groups, in operation 310. For example, as discussed above with respect to operation 220, the first subset of morphological groups may be the first morphological group and the second morphological group. The subset of morphological groups, selected in operation 310, may be a second subset of morphological groups including a third morphological group and a fourth morphological group.

In some embodiments, in providing the morphological group interface, the interface component 120 presents a group element for each morphological group of the set of morphological groups. Each group element may be a selectable user interface element representing a distinct morphological group. In some embodiments, each group element includes a representation of the morphological group or a characteristic of the morphological group represented by the group element.

In operation 320, the interface component 120 provides a password interface. The password interface may be provided in response to selection of the second subset of morphological groups. In some embodiments, the password interface prompts entry of a set of password characters. The set of password characters may be entered by the user from a keyboard input or from a touchscreen input. Once the set of password characters are entered into the password interface, the interface component 120 passes the set of password characters to the generation component 130 or to the authentication component 150.

In some instances, the set of password characters are entered, taking into account a morphology of the second subset of morphological groups. In such instances, the password characters may be entered using characters differing from those of entered in operation 230. In some embodiments, the interface component 120 presents the password interface based on the second subset of morphological groups. The interface component 120 may present the password interface as a reordered keyboard interface, mapping keys based on the second subset of morphological groups.

In operation 330, the generation component 130 generates a second morphological password. In some embodiments, the second morphological password is generated based on the set of password characters and the second subset of morphological groups. The generation component 130 may generate the second morphological password in response to receiving the user authentication and receiving selection of the set of password characters and the second subset of morphological groups. The second morphological password may be generated in a manner similar to or the same as described above with respect to operation 240.

In operation 340, the storage component 140 accesses the first morphological password within the password repository. The first morphological password may be generated in operation 240. In some embodiments, the first morphological password is accessed based on generation of the second morphological password in operation 330. The storage component 140 may access the first morphological password by accessing the password repository in any suitable manner. In some embodiments, the storage component 140 decrypts the first morphological password to retrieve the first morphological password from the password repository.

In operation 350, the authentication component 150 compares the first morphological password with the second morphological password. In some embodiments, the authentication component 150 compares characters of the first morphological password and the second morphological password. The authentication component 150 may also compare the first morphological password and the second morphological password via a hash of each morphological password. In some embodiments, the authentication component 150 cooperates with one or more of the generation component 130 and the storage component 140 to generate an encrypted version of the second morphological password. In such embodiments, the authentication component 150 compares an encrypted version of the first morphological password and the encrypted version of the second morphological password, encrypted using the same key.

In operation 360, the authentication component 150 authenticates the user based on comparing the first morphological password and the second morphological password. Where the first morphological password and the second morphological password match, based on the set of morphological groups, the authentication component 150 authenticates the user and enables access to an access-controlled system. Where the first morphological password and the second morphological password do not match, the authentication component 150 does not authenticate the user and precludes access to the access-controlled system.

In some embodiments, where an authentication fails, due to mismatch of the first morphological password and the second morphological password, a user may request a reminder. The interface component 120 may generate a notification for the reminder. The notification may comprise a password definition and an indicator of morphological groups used to generate the first morphological password. The first morphological password itself may be precluded or omitted from the notification.

By way of example, a user may create a password using the methods 200 and 300, described above. The user may define a password to generate as "AlloS." The user may initially select two groups, a first containing specified lowercase letters and a second containing numbers with curves. The morphology system 102 may generate a morphological password of "4iio5". The morphological password may maintain the ambiguity of the "o" as "o" according to defined ambiguity rules. When the user logs into a system, the user may select two different groups. For example, the user may select two subsequent groups, a third containing special characters with a curve and a fourth containing capital letters without a curve. The morphology system 102 may prompt the user to enter a password based on the subsequently selected morphological groups. The user may enter a password of "All %$". The morphology system 102 may authenticate the morphological password based on the originally generated morphological password and the subsequently selected morphological groups. As such, the user may enter a password into a device in a crowded airport or bus terminal without exposing the password to a malicious person or curious onlooker using the morphological dynamic password.

Figure 4:
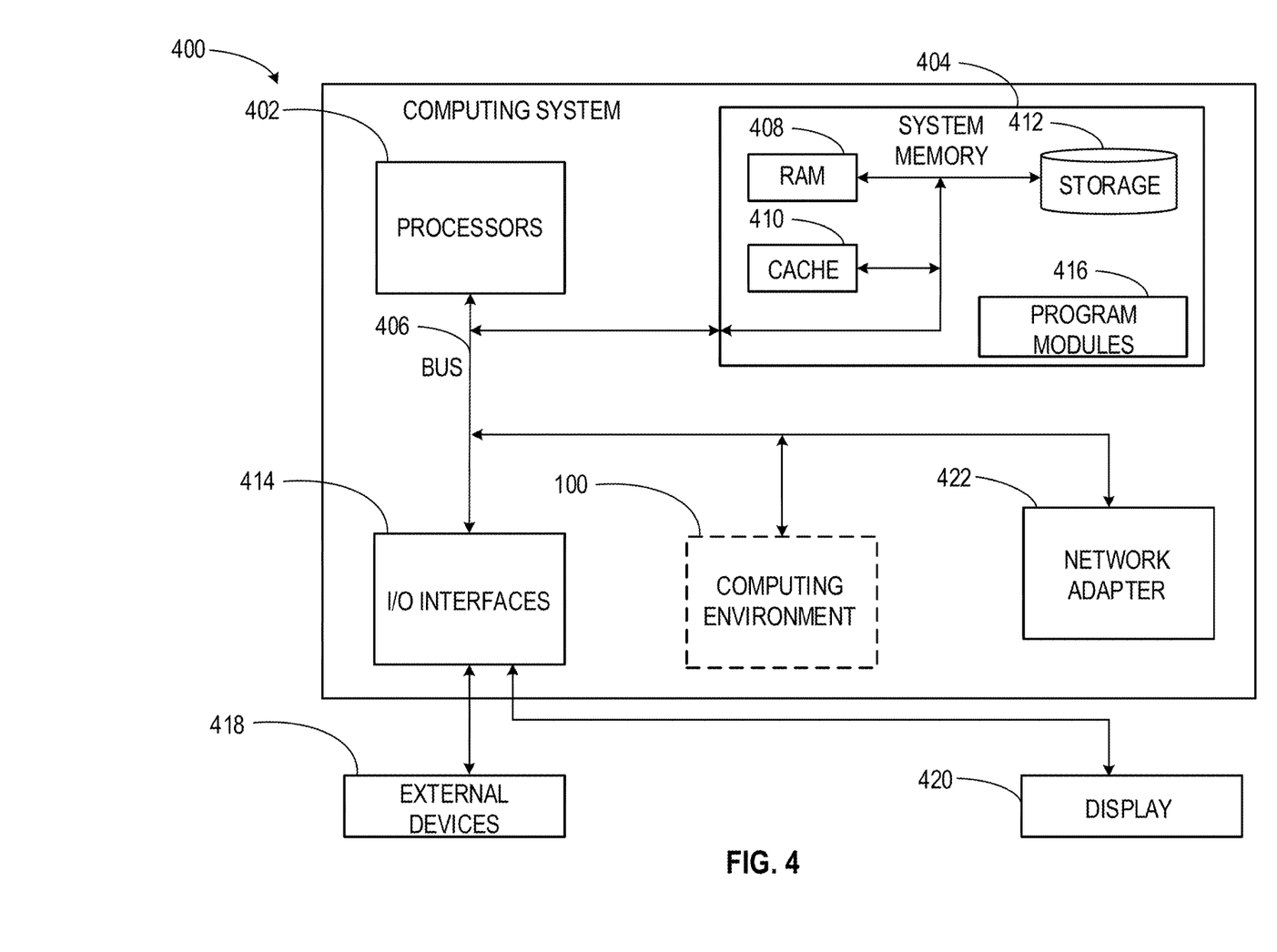
FIG. 4 depicts a block diagram of a computing system for dynamic password generation based on morphological groupings, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for dynamic password generation and authentication based on morphological groupings.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the communication component 110, the interface component 120, the generation component 130, the storage component 140, and the authentication component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
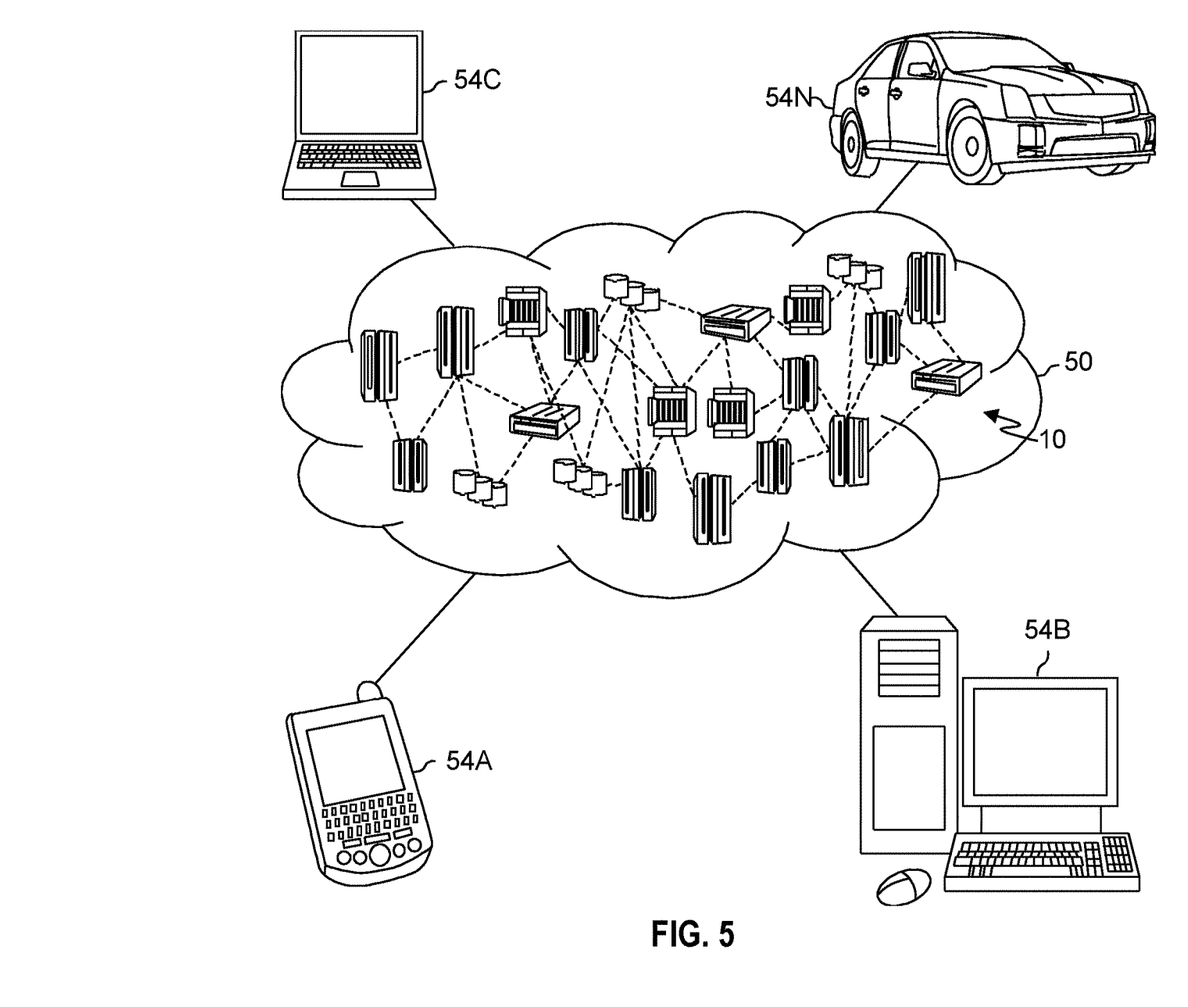
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
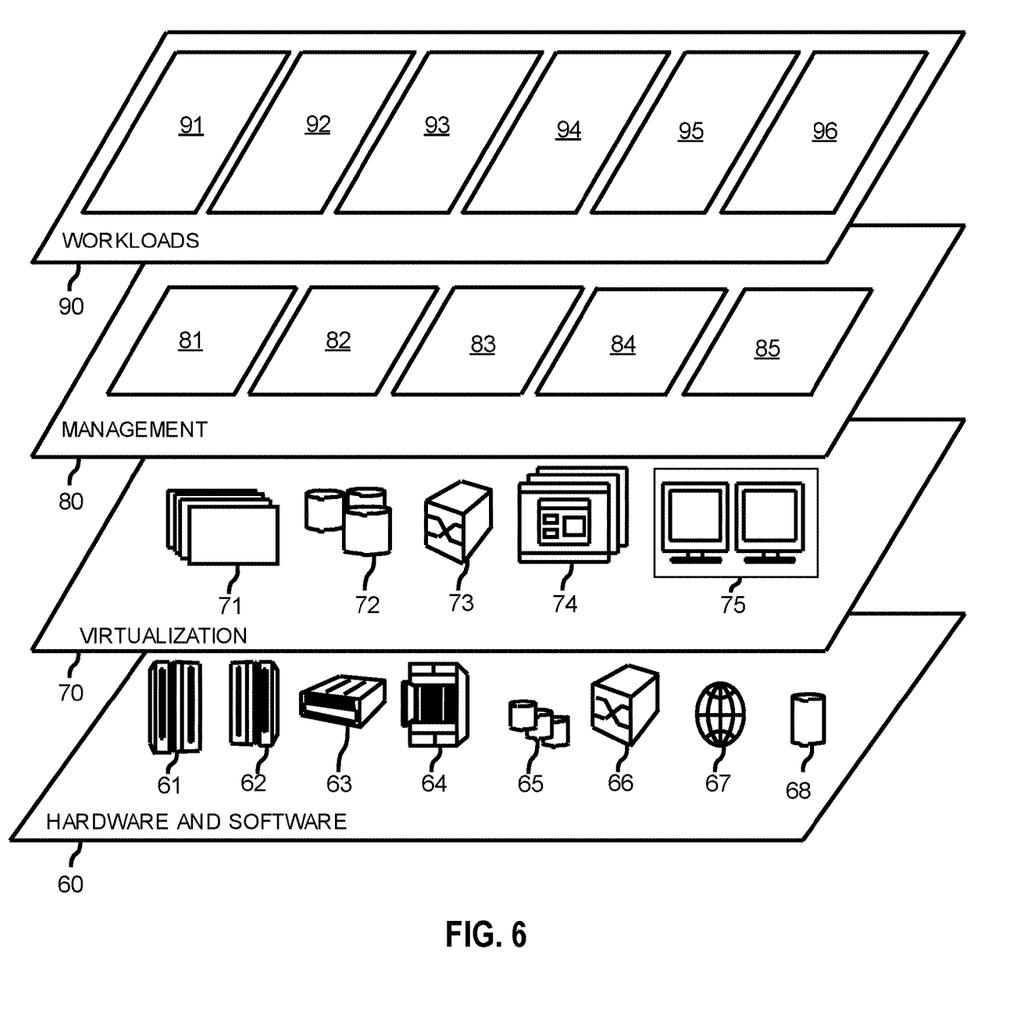
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a set of morphological groups defining a plurality of character maps;
   receiving a selection of a first subset of morphological groups by a user from the set of morphological groups;
   identifying a set of characters input from the user, the set of characters forming a user selected password;
   generating a first morphological password using the set of characters, the first subset of morphological groups selected by the user, and character maps of the first subset of morphological groups;
   storing the first morphological password in a password repository, in response to receiving a user authentication request, providing a morphological group interface prompting a selection of a second subset of morphological groups; and
   in response to the selection of the second subset of morphological groups, providing a password interface prompting entry of a set of password characters from the second subset of morphological groups.

2. The computer-implemented method of claim 1, further comprising:
   in response to receiving the user authentication request and based on the set of password characters and the second subset of morphological groups, generating a second morphological password.

3. The computer-implemented method of claim 2, further comprising:
   based on generating the second morphological password, accessing the first morphological password within the password repository;
   comparing the first morphological password with the second morphological password; and
   authenticating the user based on comparing the first morphological password and the second morphological password.

4. The computer-implemented method of claim 1, wherein morphological groups selected from the set of morphological groups for the first subset of morphological groups match morphological groups selected from the set of morphological groups for the second subset of morphological groups.

5. The computer-implemented method of claim 1, wherein morphological groups selected from the set of morphological groups for the first subset of morphological groups differ from the morphological groups selected for the second subset of morphological groups.

6. The computer-implemented method of claim 1, wherein providing the morphological group interface further comprises:
   presenting a group element for each morphological group of the set of morphological groups.

7. The computer-implemented method of claim 1, wherein storing the first morphological password further comprises: encrypting the first morphological password to generate an encrypted morphological password; and
   storing the encrypted morphological password within the password repository.

8. A system, comprising:
   one or more processors; and
   a computer-readable storage medium, coupled to the one or more processors, storing program instructions that, when executed by the one or more processors, cause the one or more processors to perform operations comprising:
   receiving a set of morphological groups defining a plurality of character maps;
   receiving a selection of a first subset of morphological groups by a user from the set of morphological groups;
   identifying a set of characters input from the user, the set of characters forming a user selected password;
   generating a first morphological password using the set of characters, the first subset of morphological groups selected by the user, and character maps of the subset of morphological groups;
   storing the first morphological password in a password repository, in response to receiving a user authentication request, providing a morphological group interface prompting a selection of a second subset of morphological groups; and
   in response to the selection of the second subset of morphological groups, providing a password interface prompting entry of a set of password characters from the second subset of morphological groups.

9. The system of claim 8, wherein the operations further comprise:
   in response to receiving the user authentication request and based on the set of password characters and the second subset of morphological groups, generating a second morphological password.

10. The system of claim 9, wherein the operations further comprise:
    based on generating the second morphological password, accessing the first morphological password within the password repository;
    comparing the first morphological password with the second morphological password; and
    authenticating the user based on comparing the first morphological password and the second morphological password.

11. The system of claim 8, wherein providing the morphological group interface further comprises:
    presenting a group element for each morphological group of the set of morphological groups.

12. The system of claim 8, wherein storing the first morphological password further comprises: encrypting the first morphological password to generate an encrypted morphological password; and storing the encrypted morphological password within the password repository.

13. A computer program product comprising a computer readable storage medium having program instructions embodied therewith, the program instructions being executable by one or more processors to cause the one or more processors to perform operations comprising:

receiving a set of morphological groups defining a plurality of character maps;

receiving a selection of a first subset of morphological groups by a user from the set of morphological groups;

identifying a set of characters input from the user, the set of characters forming a user selected password;

generating a first morphological password using the set of characters, the first subset of morphological groups selected by the user, and character maps of the subset of morphological groups;

storing the first morphological password in a password repository, in response to receiving a user authentication request, providing a morphological group interface prompting a selection of a second subset of morphological groups; and in response to the selection of the second subset of morphological groups, providing a password interface prompting entry of a set of password characters from the second subset of morphological groups.

14. The computer program product of claim 13, wherein the operations further comprise:

in response to receiving the user authentication request and based on the set of password characters and the second subset of morphological groups, generating a second morphological password.

15. The computer program product of claim 14, wherein the operations further comprise:

based on generating the second morphological password, accessing the first morphological password within the password repository;

comparing the first morphological password with the second morphological password; and authenticating the user based on comparing the first morphological password and the second morphological password.

16. The computer program product of claim 13, wherein providing the morphological group interface further comprises:

presenting a group element for each morphological group of the set of morphological groups.

17. The computer program product of claim 13, wherein storing the first morphological password further comprises:

encrypting the first morphological password to generate an encrypted morphological password; and storing the encrypted morphological password within the password repository.

\* \* \* \* \*